United States Patent
Olbrich et al.

(10) Patent No.: US 6,490,992 B2
(45) Date of Patent: Dec. 10, 2002

(54) POINTER INSTRUMENT

(75) Inventors: Helmut Olbrich, Darmstadt (DE);
Hans Kolibius, Babenhausen (DE);
Heinrich Noll, Gross-Umstadt (DE);
Stephan Zech, Eltville (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/962,366

(22) Filed: Sep. 24, 2001

(65) Prior Publication Data

US 2002/0007777 A1 Jan. 24, 2002

Related U.S. Application Data

(63) Continuation of application No. 09/171,141, filed on Feb. 1, 1999, and a division of application No. 09/171,141, filed as application No. PCT/EP97/01381 on Mar. 19, 1997, now Pat. No. 6,314,908.

(30) Foreign Application Priority Data

Apr. 19, 1996 (DE) .......................... 196 15 499

(51) Int. Cl.⁷ ............................................... G01D 11/28
(52) U.S. Cl. ................. 116/288; 116/286; 116/DIG. 36
(58) Field of Search .................. 116/288, 286, 116/287, 289, DIG. 36, 56, 57, 62.1, 284, 303, DIG. 5, DIG. 6; 174/135

(56) References Cited

U.S. PATENT DOCUMENTS

| | | | | |
|---|---|---|---|---|
| 2,792,803 A | * | 5/1957 | Hardesty | 116/286 |
| 4,163,428 A | * | 8/1979 | Ishikawa | 116/288 |
| 4,249,056 A | * | 2/1981 | MacManus | 200/1 B |
| 4,257,084 A | * | 3/1981 | Reynolds | 362/31 |
| 4,301,439 A | * | 11/1981 | Johnson et al. | 338/195 |
| 4,607,154 A | * | 8/1986 | Mills | 219/505 |
| 4,747,456 A | * | 5/1988 | Kitagawa et al. | 177/211 |
| 4,954,807 A | * | 9/1990 | Fleischer et al. | 340/459 |
| 5,142,453 A | * | 8/1992 | Ohta et al. | 362/29 |
| 5,199,376 A | * | 4/1993 | Pasco | 116/332 |
| 5,222,803 A | * | 6/1993 | Kraus | 362/226 |
| 5,254,968 A | * | 10/1993 | Zirnheld | 338/50 |
| 5,319,527 A | * | 6/1994 | Murphy et al. | 362/26 |
| 5,636,589 A | * | 6/1997 | Kato et al. | 116/286 |
| 5,697,322 A | * | 12/1997 | Hay et al. | 116/286 |
| 5,747,743 A | * | 5/1998 | Kato et al. | 174/254 |
| 5,797,345 A | * | 8/1998 | Evans et al. | 116/286 |
| 6,314,908 B1 | * | 11/2001 | Olbrich et al. | 116/288 |

FOREIGN PATENT DOCUMENTS

| | | |
|---|---|---|
| DE | 4129057 | 3/1993 |
| GB | 2004065 | 3/1979 |

\* cited by examiner

*Primary Examiner*—Christopher W. Fulton
*Assistant Examiner*—R. Alexander Smith
(74) *Attorney, Agent, or Firm*—Martin A. Farber

(57) ABSTRACT

A pointer instrument having a connecting sleeve (3) which holds an essentially transparent pointer (4), and an illuminating means (10) that radiates directly into a f lag (12) of the pointer (4) the connecting sleeve (3) having conductors (17, 18) and contact surfaces (15, 16) of conductive plastic. At its end facing away from the pointer (4), the connecting sleeve (3) has connecting contacts (13, 14) for making contact with a power supply of a circuit board (6).

16 Claims, 3 Drawing Sheets

POINTER INSTRUMENT

RELATED APPLICATION

This application is a continuation/division of our co-pending parent application Ser. No. 09/171,141 now U.S. Pat. No. 6,314,808 filed Feb. 1, 1999 under 35 USC 120, which parent application is incorporated by reference herein in its entirety.

FIELD AND BACKGROUND OF THE INVENTION

The invention relates to a pointer instrument having a pointer shaft that deflects an essentially transparent pointer, having an illuminating means that radiates directly into a flag of the pointer, having a carrier which is fastened to the pointer shaft, holds the pointer and has contact surfaces for making contact with the illuminating means, having a connecting sleeve that has connecting contacts for a connection to a power supply, and having conductors to connect the connecting contacts and the contact surfaces.

SUMMARY OF THE INVENTION

Such a pointer instrument, in which the illuminating means, together with the pointer, is fastened to the carrier and radiates directly into the pointer flag, is known. In this case, the carrier has an electrically conductive inner body that is connected to one pole of the illuminating means, and an electrically conductive outer body that is connected to the other pole of the illuminating means, the inner body and outer body being separated from each other by insulation. The connecting sleeve has an inner body, which is connected to the pointer shaft, and an outer body, these being separated from each other by an insulation layer and each having connecting contacts. The power is supplied to the connecting contacts of the connecting sleeve through two spiral spring strips, which are constructed in the manner of a sandwich with the interposition of an insulating layer. The inner body and the outer body of the connecting sleeve are each connected to one of the spring strips. The electrical connection between the carrier and the connecting sleeve is achieved via the pointer shaft and via a compression spring arranged between the outer bodies of the carrier and of the connecting sleeve.

The disadvantage with such a pointer instrument is that the connecting sleeve and the carrier consist of very many components, which are complicated to produce and to assemble. Furthermore, there is an unnecessarily large number of contact points between the power supply and the illuminating means, and these impair the functional reliability of the pointer instrument. Since the compression spring forces the carrier and the connecting sleeve away from each other, these must be connected particularly firmly to the pointer shaft, in order to ensure the permanent supply of electric power to the illuminating means.

The invention is based on the problem of configuring a pointer instrument of the type mentioned at the beginning in such a way that it is simply constructed and has a particularly high functional reliability.

According to the invention, this problem is solved by the connecting sleeve forming the carrier at its end facing the pointer, by the conductors running continuously from the connecting contacts to the contact surfaces, and by the connecting sleeve being produced from a nonconductive plastic and the conductors, the contact surfaces and the connecting contacts being produced from conductive plastic.

This configuration means that the novel pointer instrument is particularly simply constructed. Power supply to the illuminating means is thus no longer carried out, as in the case of the known pointer instrument, via the pointer shaft, which is generally produced from metal, or via the compression spring, but rather via the conductors which run continuously from the connecting contacts to the contact surfaces. By this means, the number of contact points is kept as small as possible, which increases the functional reliability of the novel pointer instrument. The use of electrically conductive plastic likewise contributes to the functional reliability of the pointer instrument, since electrically conductive plastic is not permanently covered by an electrically insulating oxide layer, as is the case with metal, for example. A further advantage of the connecting sleeve is that it has a particularly low weight, so that it is scarcely able to hamper the movement of the pointer as a result of its mass moment of inertia. The connecting sleeve can be produced, for example, completely by plastic injection molding, so that subsequent assembly is dispensed with. By this means, the connecting sleeve is configured particularly cost-effectively.

The novel pointer instrument can be assembled very simply if the connecting contacts are designed as plug-in contacts. In this way, the connecting sleeve is simply plugged onto the pointer shaft for the purpose of assembly.

The connecting sleeve is configured in a particularly space-saving manner and at the same time has a good mechanical connection to the pointer if, according to an advantageous development of the invention, it is of mushroom-like configuration and holds the pointer with its cap region.

The illuminating means could be, for example, an incandescent filament. However, the illuminating means has a particularly low energy consumption and is able to illuminate the pointer well if it is an LED chip. Furthermore, such an LED chip has a particularly long service life, as compared with other illuminating means, so that exchange of the illuminating means during the service life of the pointer instrument only has to be carried out infrequently, if at all.

The pointer flag is particularly well illuminated, without the outlay in terms of assembly for the pointer instrument being increased, if, according to an advantageous development of the invention, reflectors of electrically conductive plastic are arranged at that end of the connecting sleeve which faces the pointer, and if at least two reflectors are designed as contact surfaces for making contact with the illuminating means.

The illuminating means can be exchanged easily if, according to another advantageous development of the invention, the connecting sleeve has, at its end facing the pointer, a mount which is upright, of C-shaped cross section, open at the top and in the direction of the pointer flag and has contact surfaces arranged in it, and if the illuminating means is arranged on a circuit board which is designed to be pushed into the mount. By this means, the connecting sleeve may be produced as a standard component for different pointer instruments which are intended to have pointers that have different brightnesses or various colors.

In order to set the brightness, in particular of light-emitting diodes, the latter are often preceded by balancing resistors. These balancing resistors are configured particularly simply if a planar balancing resistor is applied to the surface of the connecting sleeve. Such a planar balancing resistor may be removed, for example using a laser beam, until the desired resistance value and hence the desired brightness of the illuminating means has been reached.

It is often the case that the pointer of the novel pointer instrument pivots only over a range of 120° to 270°. In this case, the electrical connection between the connecting sleeve and the power supply is particularly simply configured, according to another advantageous development of the invention, if the connecting sleeve has sinuous wires of conductive plastic that are injection molded on. By virtue of the sinuous shape, the wires can be bent and stretched easily, by which means the movement of the pointer shaft is not impeded.

According to another advantageous development of the invention, contact is made between the connecting sleeve and the power supply in a particularly space-saving manner if a bifilar helical spring with a low spring force is soldered onto the connecting contacts of the connecting sleeve.

In the case of pointers that pivot over a particularly large range, contact may be made with the connecting sleeve, as in the known pointer instrument, using spiral springs, which would then have to be soldered or plugged onto the connecting sleeve. These spiral springs either could have a particularly low spring force or could be arranged in pairs and in opposite directions. However, contact is made between the connecting sleeve and the power supply particularly simply in design terms if the pointer instrument has a flexible, spiral sheet with conductor tracks printed on it, and the conductor tracks are soldered or clamped to the power supply and to the connecting contacts of the connecting sleeve. Such a sheet can be produced particularly cost-effectively, and has a barely perceptible spring force.

According to another advantageous development of the invention, contact is made between the connecting sleeve and the power supply particularly simply if a strip of a heat-seal sheet with conductor tracks printed on it is arranged between the connecting sleeve and the power supply, the heat-seal sheet being swept in a U shape between the power supply and the connecting sleeve when the pointer is in a basic position. By the heat-seal sheet being heated and pressed simultaneously onto the connecting contacts of the connecting sleeve and of the power supply, this sheet is fastened and, at the same time, contact is made with it.

According to another advantageous development of the invention, the connecting sleeve is quick to assemble and disassemble if the connecting sleeve has slip rings running around its circumference at different heights, against which prestressed contact springs rest, these springs being connected to the power supply of the pointer instrument. Since in this case the number of slip rings is limited only by the dimensions of the connecting sleeve, it is possible here to insert a plurality of illuminating means very easily and to activate them differently. For example, a plurality of illuminating means of different colors can be inserted, and the pointer can, in different states, be illuminated in different colors.

The connecting sleeve has no mechanical connection to the power supply of the pointer instrument if the connecting sleeve has a first coil, which is located opposite a second coil of the pointer instrument, the second coil being designed to set up a magnetic field and to generate an electric current in the first coil. This configuration is particularly advantageous in the case of pointers which are intended to have the lowest possible inherent damping. Furthermore, in this case the risk of contamination of slip rings or of breakage of springs and sheets is ruled out.

BRIEF DESCRIPTION OF THE DRAWINGS

The invention permits numerous embodiments. To illustrate its basic principle further, several of these embodiments are illustrated in the drawing and will be described below. In the drawing.

DETAILED DESCRIPTION OF THE PREFERRED EMBODIMENT

Figure 1:
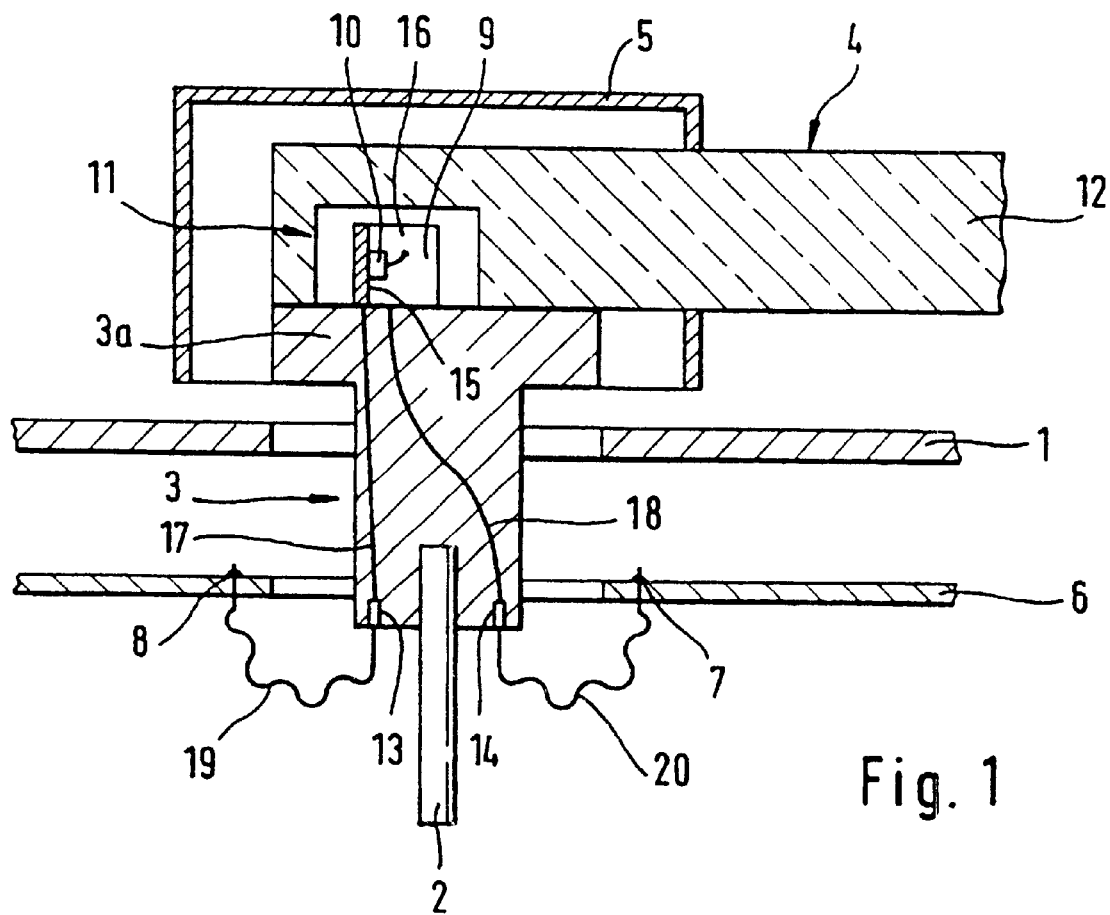
FIG. 1 shows a sectional illustration through an upper region of a novel pointer instrument having a pointer fastened to a connecting sleeve.

FIG. 1 shows a detail from a pointer instrument having a dial face 1, which is penetrated by a connecting sleeve 3 that is plugged onto a pointer shaft 2. Fastened to the connecting sleeve 3 is a pointer 4. In the region of the connecting sleeve 3, the pointer 9 has a cap 5 made of an opaque material. Arranged underneath the dial face 1 is a circuit board 6 having contacts 7, 8 for a power supply. Located on the upper side of the connecting sleeve 3 is an upright reflector 9 having an illuminating means 10, these projecting into a recess 11 in the pointer 4. The reflector 9 and the illuminating means 10 are aligned such that light radiated by them is radiated directly into a flag 12 of the pointer 4.

The connecting sleeve 3 forms a carrier 3a at an end of the sleeve 3 facing the pointer 4.

The connecting sleeve 3 is produced from nonconductive plastic and has conductors 17, 18 of conductive plastic which run continuously from connecting contacts 13, 14 on its underside to contact surfaces 15, 16 on its upper side. In order to supply the illuminating means with electrical power, sinuous wires 19, 20 of conductive plastic are injection molded onto the connecting contacts 13, 14 of the connecting sleeve 3.

While the wires 19, 20 are portrayed as hanging loose in FIG. 1, it is to be understood that, by way of alternative embodiment, they may be configured in helical form, as will be described for the conductor tracks 28, 29 in FIG. 3, in which case the wires 19, 20 serve as a bifilar helical spring with a low spring force wherein the wires 19, 20 would be soldered onto the connecting contacts 13, 14 of the connecting sleeve 3 as shown in FIG. 1.

Figure 2:
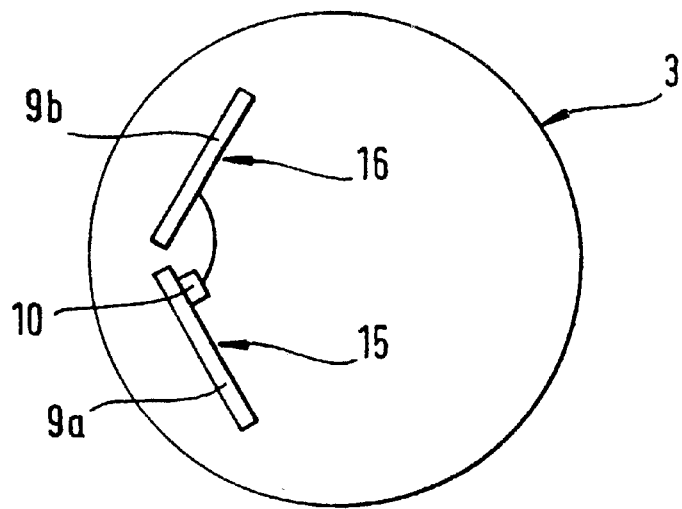
FIG. 2 shows a plan view of the connecting sleeve from FIG. 1.

FIG. 2 shows the connecting sleeve 3 of FIG. 1 from above. It can be clearly seen here that two reflectors 9a, 9b are arranged on the connecting sleeve 3 and at the same time constitute contact surfaces 15, 16 for the illuminating means 10. In this case, the illuminating means 10 is an LED chip bonded onto the reflectors 9a, 9b.

Figure 3:
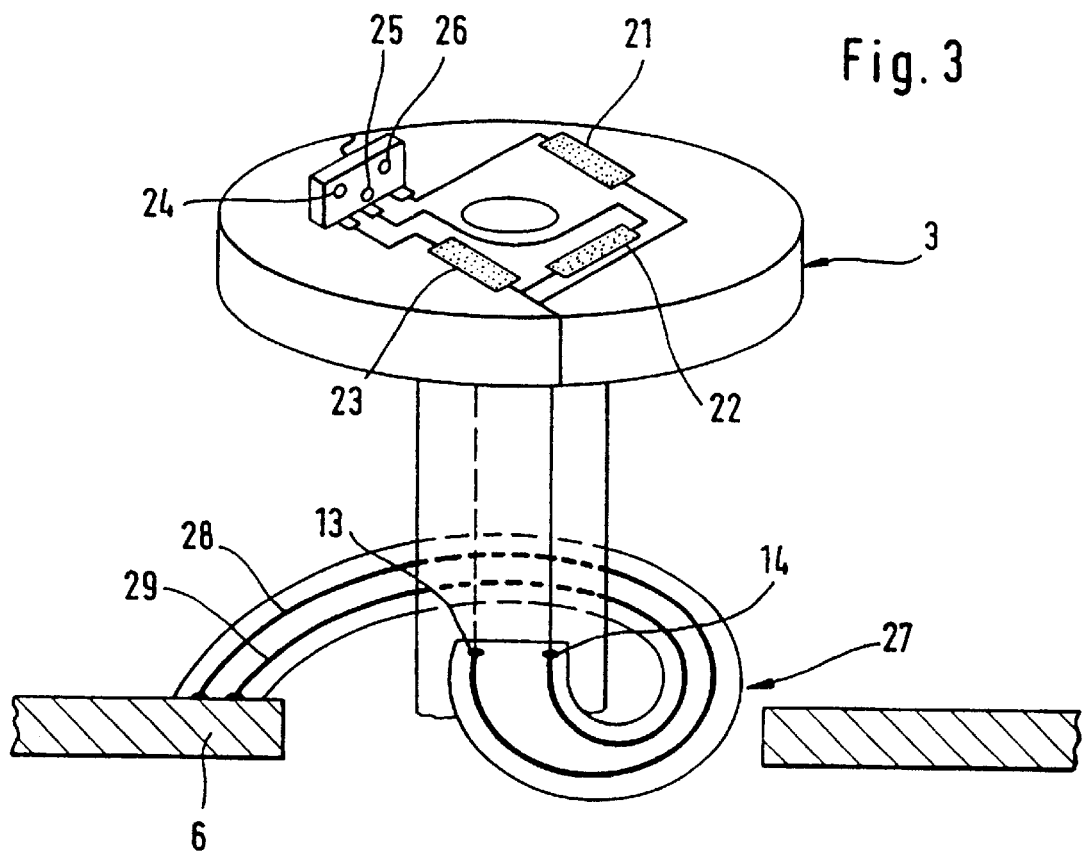
FIG. 3 shows a connecting sleeve with balancing resistors arranged on it.

FIG. 3 shows a plurality of balancing resistors 21–23 which are applied to the upper side of the connecting sleeve 3 and are each connected to an illuminating means 24–26. The balancing resistors 21–23 can be changed by material removal by means of a laser beam, so that in this way uniform brightness of the illuminating means 24–26 may be set. The connecting contacts 13, 14 of the connecting sleeve 3 are soldered to conductor tracks 28, 29 printed onto a flexible, spiral sheet 27. The other end of the sheet 27 is connected to the circuit board 6 to provide a power supply.

Figure 4:
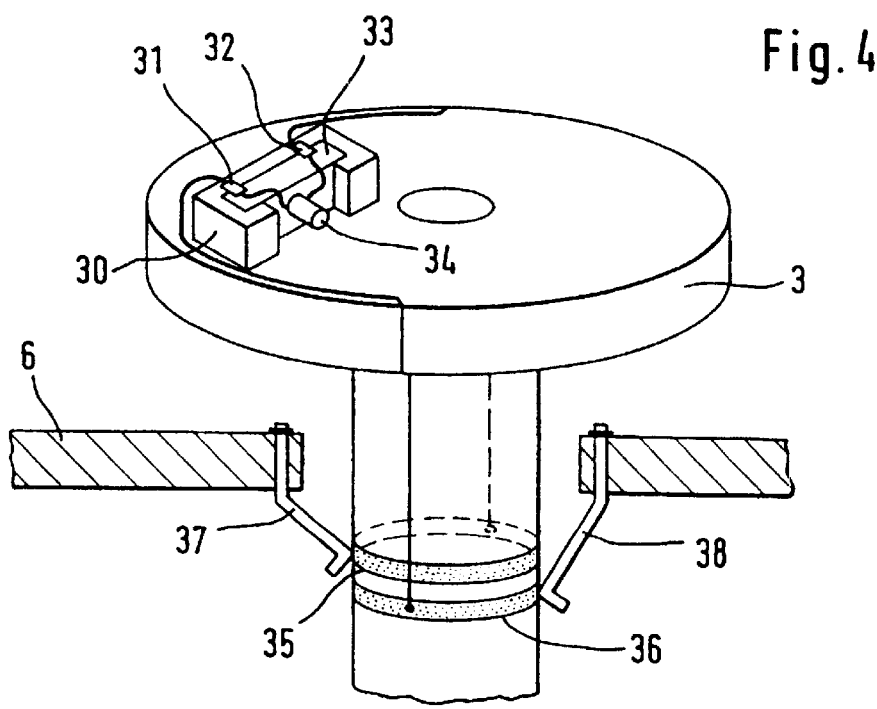
FIG. 4 shows a connecting sleeve having a mount for an illuminating means fastened to a circuit board.

In FIG. 4, the connecting sleeve 3 has, at its end facing the pointer illustrated in FIG. 1, a mount 30 which is upright, of C-shaped cross section and has contact surfaces 31, 32 machined into it. This mount 30 is designed to accommodate an illuminating means 34 arranged on a circuit board 33. The circuit board 33 is pushed into the mount 30 and, at the same time, contact is made with the contact surfaces 31, 32 in the connecting sleeve 3. The electrical connection between the connecting sleeve 3 and the power supply is carried out via slip rings 35, 36 that run around the connecting sleeve 3 and against which contact springs 37, 38 fastened to the circuit board 6 rest.

Figure 5:
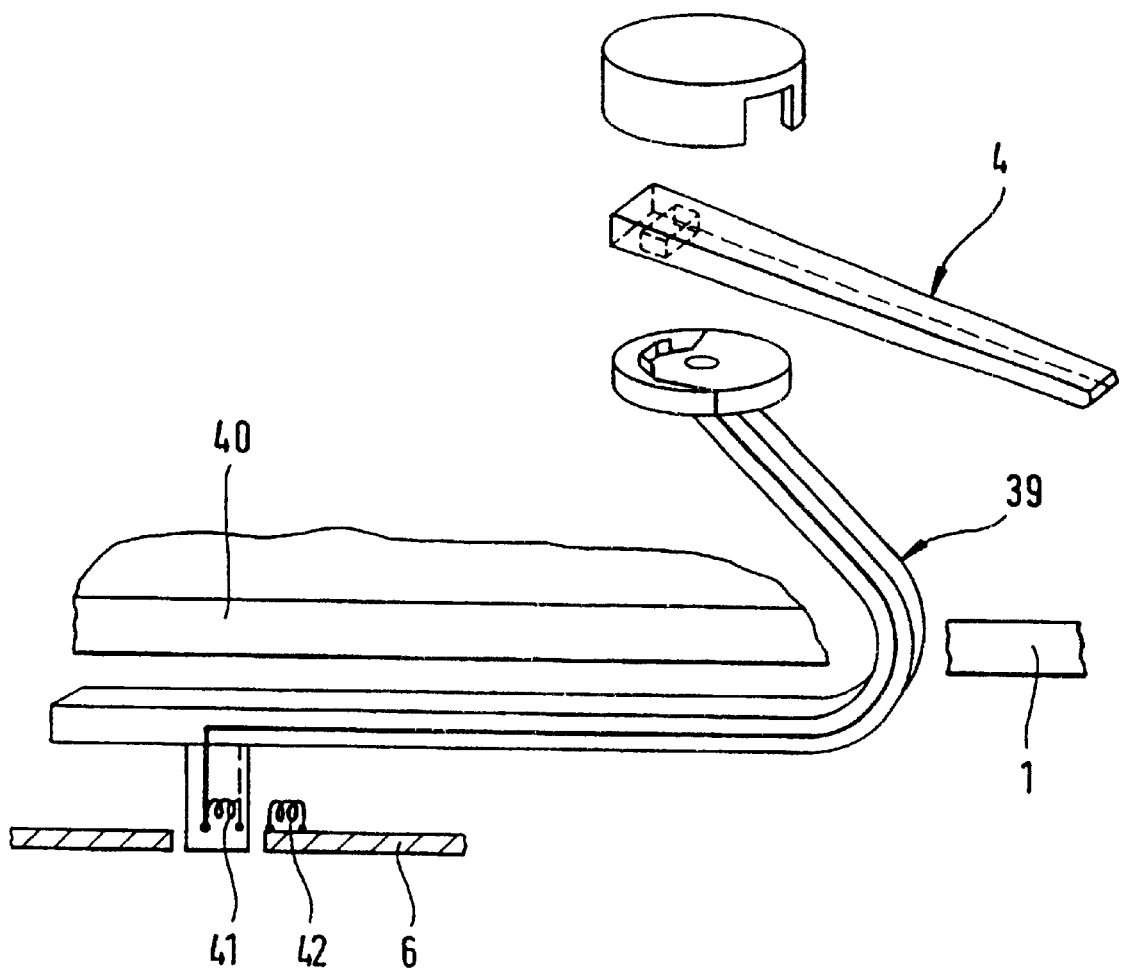
FIG. 5 shows a sectional illustration through an upper region of a pointer instrument having a bentover connecting sleeve.

FIG. 5 shows a bent-over connecting sleeve 39, which at its end facing the pointer 4 is configured as described in FIG. 1. As a result of using the bent-over connecting sleeve 39, it is possible for an LCD screen 40 to be arranged in a radially inner region of the pointer instrument, while the dial face 1 is located in a radially outer region. Electric power to the illuminating means 10 illustrated in FIG. 1 is supplied via a first coil 41, arranged in the connecting sleeve 39, and a second coil 42, arranged on the circuit board 6. These coils 41, 42 are arranged opposite each other, so that the electric power is transmitted by induction from the second coil 42 to the first coil 41.

We claim:

1. A pointer instrument comprising:

a pointer shaft;

an essentially transparent pointer having a flag, and being deflectable by rotation of the shaft;

illuminating means projecting into a recess in the pointer in order to radiate light directly into the flag of the pointer;

a connecting sleeve interconnecting the shaft with the pointer, wherein a part of the sleeve facing the pointer is formed as a carrier, the sleeve having thereon connecting contacts for a connection to a power supply and being secured to the pointer shaft, the carrier holding the pointer and the carrier having contact surfaces establishing contact with the illuminating means, the connecting sleeve having an upper side on which the illuminating means are located;

electrical conductors extending along the sleeve from the connecting contacts to the contact surfaces, the contact surfaces being located on the upper side of the connecting sleeve; and wherein the connecting sleeve is made of nonconductive plastic; and wherein the conductors, the contact surfaces and the connecting contacts are made of conductive plastic, and serve to provide electric power to the illuminating means.

2. The pointer instrument according to claim 1, wherein the connecting contacts are configured as plug-in contacts.

3. The pointer instrument according to claim 1, wherein the part of the connecting sleeve forming the carrier is enlarged in a configuration of a cap region, and wherein the pointer is held by the cap region.

4. The pointer instrument according to claim 1, wherein the illuminating means is an LED chip.

5. The pointer instrument according to claim 1, further comprising a planar balancing resistor applied to a surface of the connecting sleeve.

6. The pointer instrument according to claim 5, wherein the planar balancing resistor is operatively coupled to the illuminating means, and wherein the planar balancing resistor has a resistance value which is adjustable to obtain a desired brightness of the illuminating means by use of a laser beam.

7. The pointer instrument according to claim 1, further comprising sinuous wires of conductive plastic which are injection molded onto the sleeve.

8. The pointer instrument according to claim 7, wherein the sinuous wires are injection molded onto the connecting contacts of the connecting sleeve at one end and are connected to the power supply at the other end.

9. The pointer instrument according to claim 1, further comprising a bifilar helical spring which is coupled to the connecting contacts of the connecting sleeve.

10. The pointer instrument according to claim 9, wherein the bifilar helical spring is soldered onto the connecting contacts of the connecting sleeve.

11. The pointer instrument according to claim 1, further comprising a flexible, spiral sheet with conductor tracks printed thereon, wherein the conductor tracks are electrically coupled to the power supply and to the connecting contacts of the connecting sleeve.

12. The pointer instrument according to claim 11, wherein the conductor tracks of the flexible, spiral sheet are soldered to the power supply and to the connecting contacts of the connecting sleeve.

13. The pointer instrument according to claim 11, wherein the conductor tracks of the flexible, spiral sheet are clamped to the power supply and to the connecting contacts of the connecting sleeve.

14. The pointer instrument according to claim 1, further comprising slip rings extending around a circumference of the connecting sleeve at different heights, and prestressed contact springs resting against the slip rings, wherein the contact springs are connected to the power supply of the pointer instrument.

15. The pointer instrument according to claim 1, further comprising a first coil and a second coil, wherein the connecting sleeve carries the first coil, the first coil being located opposite the second coil and the second coil providing a magnetic field which induces an electric current in the first coil.

16. The pointer instrument according to claim 1, wherein the illuminating means is an incandescent filament.

* * * * *